(12) United States Patent
Mizobata

(10) Patent No.: US 9,145,080 B2
(45) Date of Patent: Sep. 29, 2015

(54) VEHICLE SEATS

(71) Applicant: TOYOTA BOSHOKU KABUSHIKI KAISHA, Aichi-ken (JP)

(72) Inventor: Hiroshi Mizobata, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/198,916

(22) Filed: Mar. 6, 2014

(65) Prior Publication Data

US 2014/0339864 A1 Nov. 20, 2014

(30) Foreign Application Priority Data

May 15, 2013 (JP) .................................. 2013-103106
Nov. 26, 2013 (JP) .................................. 2013-243743

(51) Int. Cl.
*B60N 2/427* (2006.01)
*B60N 2/48* (2006.01)

(52) U.S. Cl.
CPC .................................... *B60N 2/4885* (2013.01)

(58) Field of Classification Search
CPC ............................ B60N 2/4838; B60N 2/4864
USPC ..................................................... 297/216.12
See application file for complete search history.

(56) References Cited

U.S. PATENT DOCUMENTS

| | | | | |
|---|---|---|---|---|
| 3,680,912 A * | 8/1972 | Matsuura | ............. | 297/216.12 X |
| 6,079,776 A * | 6/2000 | Breitner et al. | .......... | 297/216.12 |
| 7,111,901 B2 * | 9/2006 | Schlierf et al. | ........... | 297/216.12 |
| 8,075,051 B2 * | 12/2011 | Vitali | ....................... | 297/216.12 |
| 2005/0116515 A1 * | 6/2005 | Schlierf et al. | ........... | 297/216.12 |

FOREIGN PATENT DOCUMENTS

JP 2008-149862 7/2008

* cited by examiner

*Primary Examiner* — Rodney B White
(74) *Attorney, Agent, or Firm* — Greenblum & Bernstein, P.L.C.

(57) ABSTRACT

Embodiments may include a vehicle seat having a seatback and a headrest. The headrest has a first headrest portion, a second headrest portion and an elastic portion. The first headrest portion is connected to the seatback. The second headrest portion is arranged closer to an occupant than the first headrest portion. The second headrest portion is movable relative to the first headrest portion. The elastic portion generates an elastic force so as to restore the second headrest portion to an initial position when the second headrest portion moves from the initial position.

9 Claims, 21 Drawing Sheets

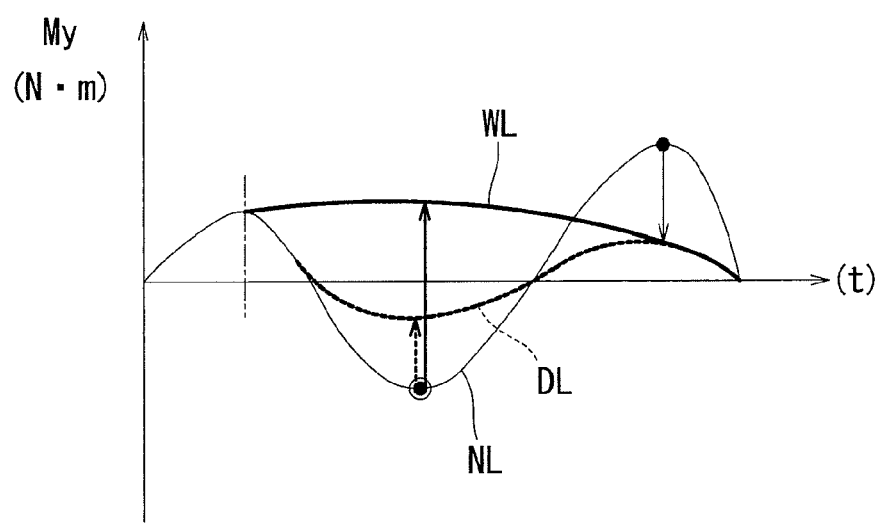
F I G. 27

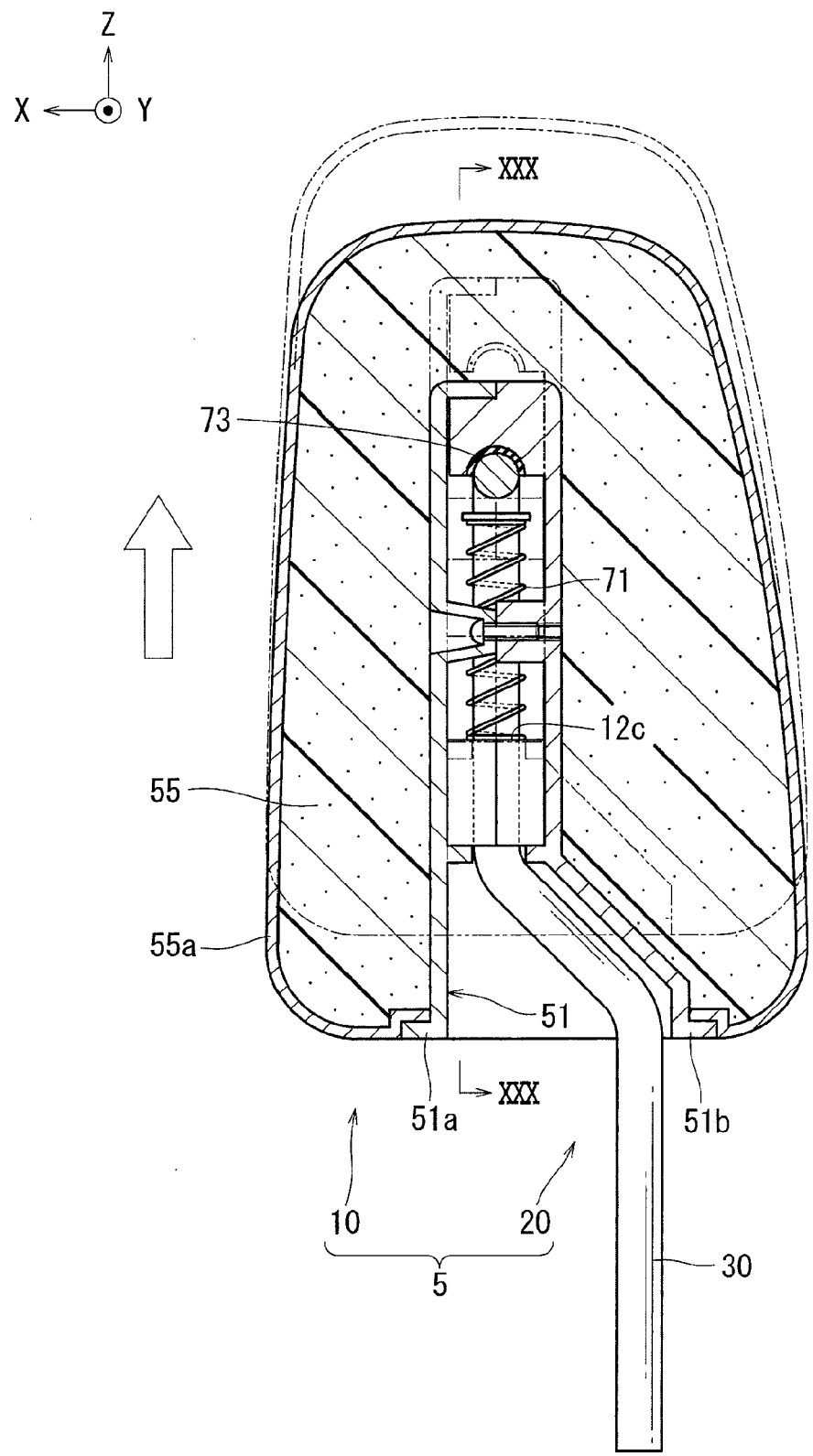
F I G. 28

VEHICLE SEATS

This application claims priority to Japanese patent applications serial number 2013-103106 and 2013-243743, the contents of which are incorporated herein by reference.

BACKGROUND OF THE INVENTION

1. Field of the Invention

Embodiments of the present invention relate to vehicle seats, specifically to vehicle seats with a headrest.

2. Description of the Related Art

A conventional vehicle seat such as a car seat is equipped with a headrest for supporting the head of an occupant. An interior of the headrest is filled with a pad configured to exert an appropriate elastic force. When, for example, a collision is generated from behind a car (hereinafter such collision from behind will be referred to as "back collision"), the headrest reliably supports the head of the occupant. This helps to secure the safety of the occupant.

There are various kinds of back collisions. For example, as shown in FIGS. 14 to 17, there is a collision in which the occupant is thrown backwards before his body moves upward. As shown in FIGS. 18 to 22, there is a collision in which the occupant is thrown backwards before his body moves downward. Further, there is a collision in which the body moves upward before moving downward.

In the case when the body moves upward after the collision, the head of the occupant is supported as long as it is supported by the pad of the headrest. As shown in FIG. 16, however, when the body moves upward, the head receives a backward rotating force. As a result, there is a possibility of the occupant suffering a so-called whiplash injury.

Also in the case when the seat falls down toward the floor after the collision, relative movement between the head and the headrest is typically generated. As a result, there is the possibility that the occupant may suffer a whiplash injury.

In the situation when the body moves downward after the collision, the head of the occupant is supported as long as it is supported by the pad of the headrest. As shown in FIG. 21, however, when the body moves downward, the head receives a forwardly rotating force. As a result, there is the possibility that the occupant may suffer a whiplash injury.

Japanese Laid-Open Patent Publication No. 2008-149862 discloses a vehicle seat headrest having a tension spring and a sensor. When the sensor predicts a back collision, urging force of the tension spring is released by using a solenoid. The tension spring causes the movable headrest to move upward. The headrest is forcibly moved upward not at the point in time when the back collision is generated but at the stage when the back collision is predicted. Thus, when the body of the occupant moves upward, there is a possibility that the timing with which the body moves does not coincide with the timing with which the headrest moves. Accordingly, it may be impossible to sufficiently prevent the backward rotation of the head of the occupant. Even when simultaneous timing is attained, the movement distance of the headrest is fixed. Thus, when the movement distance of the headrest is excessive or insufficient, it may be impossible to sufficiently prevent the backward rotation of the head of the occupant. When the body of the occupant moves downward, the headrest may further increase the force with which the head of the occupant is rotated forward. This phenomenon is undesirable.

Therefore, there is a need in the art for a vehicle seat which helps to reduce a burden on an occupant's neck when a back collision or the like occurs.

SUMMARY OF THE INVENTION

According to an aspect of the invention, certain embodiments of the present invention include a vehicle seat having a seatback and a headrest. The headrest has a first headrest portion, a second headrest portion and an elastic portion. The first headrest portion is connected to the seatback. The second headrest portion is arranged closer to the occupant than the first headrest portion. The second headrest portion is movable relative to the first headrest portion. The elastic portion generates an elastic force so as to restore the second headrest portion to an initial position when the second headrest portion moves from the initial position.

Therefore, when a back collision or the like occurs, an occupant's head is pushed to the second headrest portion. Moreover, the occupant's head moves upward or backward. The elastic portion allows the second headrest portion to move upward or backward. Thus, a resistance force against the movement of the occupant's head is not rapidly but gradually exerted because of the elastic portion. Thereby, an abrupt force applied to the occupant's head may be reduced.

In another aspect of the invention, the elastic portion may have an upper elastic member provided above an elastic member contact portion of the second headrest portion and a lower elastic member provided under the elastic member contact portion. Thus, even when the elastic portion ceases to exert its function due to age deterioration or the like, it is possible to obtain an appropriate elastic force by replacing the elastic member with a new one. Thus, it is possible to exert a desired function with a relatively simple construction.

In another aspect of the invention, the vehicle seat may further include a guide mechanism. The guide mechanism guides the second headrest portion so that the second headrest portion is allowed to move in a vertical direction. The elastic portion biases the second headrest portion at the initial position at least upwardly. The second headrest portion is movable both upward and downward from the initial position.

Thus, when the occupant's head contacts the second headrest portion at the time of back collision or the like, the second headrest portion may move appropriately in the vertical direction. The second headrest portion may move quickly from the initial position in conformity with the direction of the force received. As a result, when the back collision or the like occurs, the rotation of the occupant's head is prevented or reduced. Thus, it is possible to reduce the possibility of a whiplash injury or the like in the occupant. By releasing the force received from the outside, the second headrest can be restored to the initial position by the elastic portion.

In another aspect of the invention, the elastic portion may have an upper elastic member and a lower elastic member. The upper elastic member can expand and contract in the vertical direction, and is provided above an elastic member contact portion of the second headrest portion. The lower elastic member can expand and contract in the vertical direction, and is provided under the elastic member contact portion. At least one of the upper elastic member and the lower elastic member is formed so as to be capable of being spaced away from both the first headrest portion and the second headrest portion.

Thus, the elastic force of the upper elastic member and the elastic force of the lower elastic member can be separately adjusted. One of the elastic members may bias the second headrest portion when the second headrest portion moves upward. The other of the elastic members may bias the second headrest portion when the second headrest portion moves downward. Thus, the spring constant of one of the elastic members is determined without considering a balance with the spring constant of the other elastic member.

In another aspect of the invention, the elastic modulus of the upper elastic member may differ from elastic modulus of the lower elastic member. Thus, the biasing force for moving the second headrest portion in the vertical direction may be appropriately set.

BRIEF DESCRIPTION OF THE DRAWINGS

FIG. 27 is a chart for showing a change in the moment applied to the occupant's head when a back collision occurs while using the headrest of FIGS. 23 and 26 and a conventional headrest;

FIG. 28 is a vertical cross-section of the headrest having the headrest stay as the first headrest portion;

DETAILED DESCRIPTION OF THE INVENTION

Each of the additional features and teachings disclosed above and below may be utilized separately or in conjunction with other features and teachings to provide improved vehicle seats. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
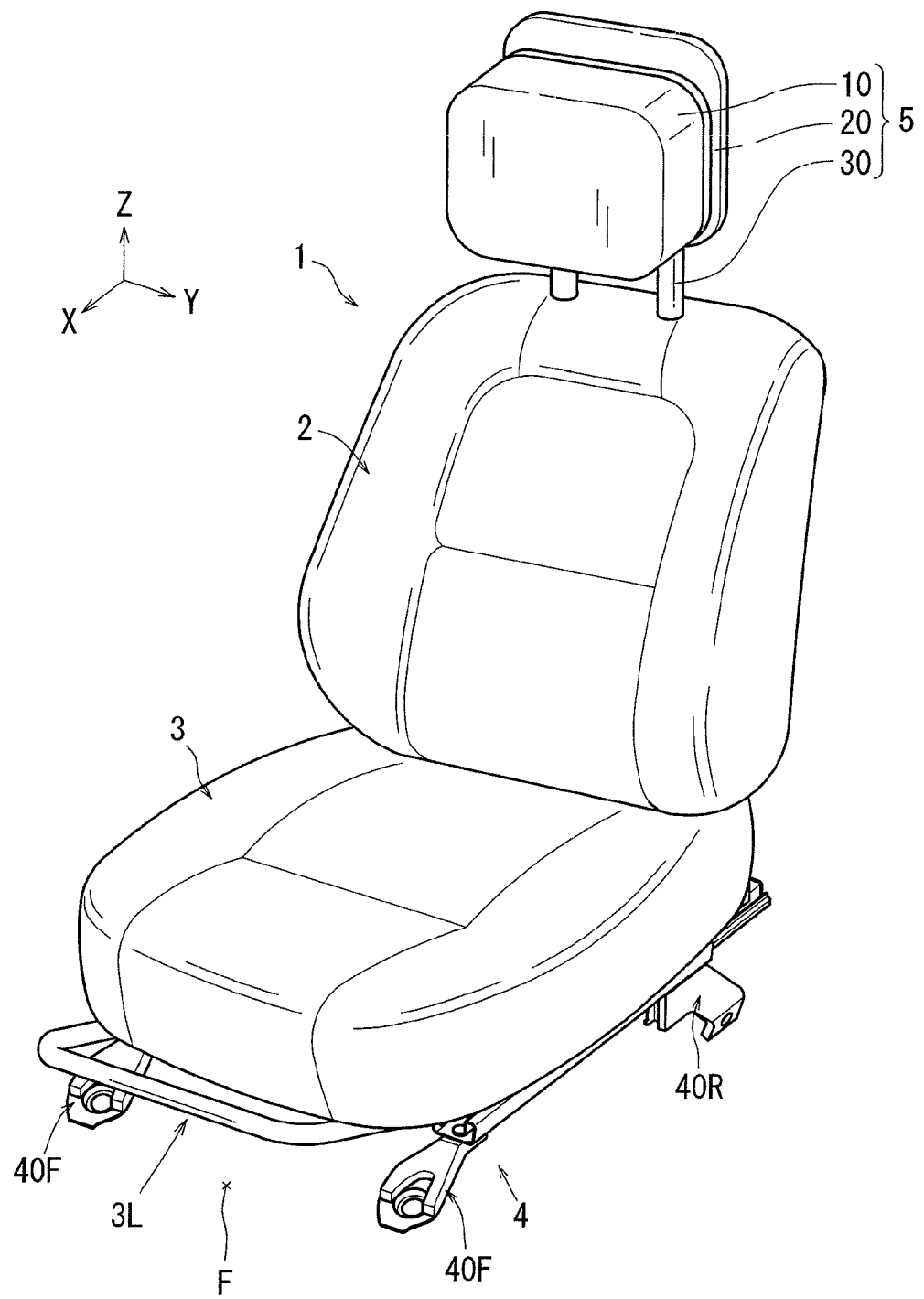
FIG. 1 is a perspective view of a vehicle seat of the present invention.

In FIG. 1, etc., symbol X indicates a forward direction, symbol Y indicates a leftward direction, and symbol Z indicates an upward direction. For example, when the occupant P sits in a vehicle seat 1, a front side comes into view of the occupant P, whereas the rear side does not. The vehicle seat 1 is provided with a headrest 5, a seatback 2, and a seat cushion 3. Mainly a head PH of the occupant P contacts the headrest 5. Mainly a body PB of the occupant P contacts the seatback 2. Mainly thighs PL of the occupant P contact the seat cushion 3.

A relative angle between the seatback 2 and the seat cushion 3 can be changed by a reclining mechanism (not shown). The vehicle seat 1 is provided with a slide device 4. The slide device 4 allows the vehicle seat 1 to move in a longitudinal direction with respect to a vehicle floor F. The slide device 4 is mounted on the floor F by attaching members 40F and 40R. Through operation of an operation lever 3L, the occupant P can move the seat cushion 3, etc. in the longitudinal direction. By releasing the operation lever 3L, the seat cushion 3, etc. can be fixed in any position. The headrest 5 is provided with a headrest stay 30 attached to the seatback 2.

The seatback 2 has a back frame (not shown) having an upper frame in its upper portion. Two tubular holders (not shown) are arranged in parallel in the upper frame. Each second holder is inserted into the each tubular holder, whereby a headrest support (not shown) is sustained in any position. The headrest support is adjusted in height and locked by using the headrest stay 30.

The seatback 2 has a back pad (not shown). The back pad is arranged mainly at a front of the back frame in order to support the occupant P. A seat cover is mounted to at least one of the back pad and the back frame so as to press the back pad against the back frame.

The seat cushion 3 is of a construction similar to that of the seat back 2. The seat cushion 3 is provided with a cushion frame (not shown). A cushion pad (not shown) is arranged at an upper area of the cushion frame in order to support the occupant P. A seat cover is mounted to at least one of the cushion pad and the cushion frame so as to press the cushion pad against the cushion frame. The vehicle is, for example, that of a car.

As shown in FIG. 1, the headrest 5 has a first headrest portion 20 and a second headrest portion 10. The first headrest portion 20 is fixed to an upper side of the headrest stay 30. The second headrest portion 10 mainly faces the head PH of the occupant P. The first headrest portion 20 supports the second headrest portion 10 so as to be vertically movable.

The first headrest portion 20 is provided with a headrest guide portion. The headrest guide portion helps the second headrest portion 10 to move appropriately when the second headrest portion 10 moves vertically. The headrest guide portion is held in sliding contact with a headrest slide contact portion provided on the second headrest portion 10. A guide mechanism has the headrest guide portion and the headrest slide contact portion. The guide mechanism performs guiding in a direction in which the second headrest portion 10 moves. The headrest guide portion constitutes a portion of the first headrest portion 20. The headrest slide contact portion constitutes a portion of the second headrest portion 10.

The second headrest portion 10 is provided with a pad 11 and a support plate 12. The pad 11 is provided on a front portion facing the second headrest portion 10. The pad 11 has a cushioning property. The surface of the pad 11 can contact the head PH of the occupant at the time of collision or the like. The support plate 12 is provided on the back of the pad 11. An elastic member contact portion 12c is provided so as to be capable of contacting elastic members 7. An elastic force of the elastic members 7 is transmitted to the elastic member contact portion 12c. The height of the second headrest portion 10 is determined by the elastic member contact portion 12c. The elastic member 7 of the first headrest portion 20 supports the second headrest portion 10. The elastic members 7 consist, for example, of springs, and, more preferably, coil springs 71 formed by spirally winding steel wires.

One end of each coil spring 71 is mounted to the first headrest portion 20. The other end is arranged at a position so as to contact the elastic member contact portion 12c provided on the back of the second headrest portion 10. The coil springs 71 are respectively arranged on the upper and lower of the elastic member contact portion 12c. An upper coil spring 71a is arranged above the elastic member contact portion 12c. A lower coil spring 71b is arranged under the elastic member contact portion 12c. The lower end of the upper coil spring 71a is connected to the elastic member contact portion 12c. The upper end of the upper coil spring 71a is connected to the first headrest portion 20. The upper end of the lower coil spring 71b is connected to the elastic member contact portion 12c. The lower end of the lower coils spring is connected to the first headrest portion 20. The upper coil spring 71a and the lower coil spring 71b may be of the same spring. The coil springs 71 are arranged such that their center axes extend in the vertical direction. The first headrest portion 20 has elastic force receiving surfaces 24a to receive the elastic force generated in the coil springs 71.

Figure 8:
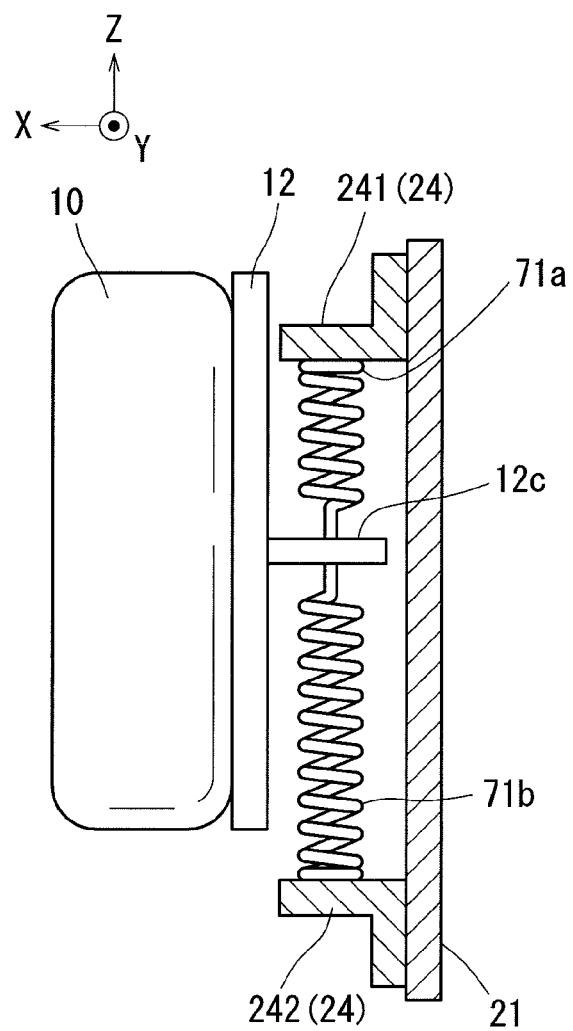
FIG. 8 is a side view of the headrest when no gravity is applied to the second headrest portion.
Figure 9:
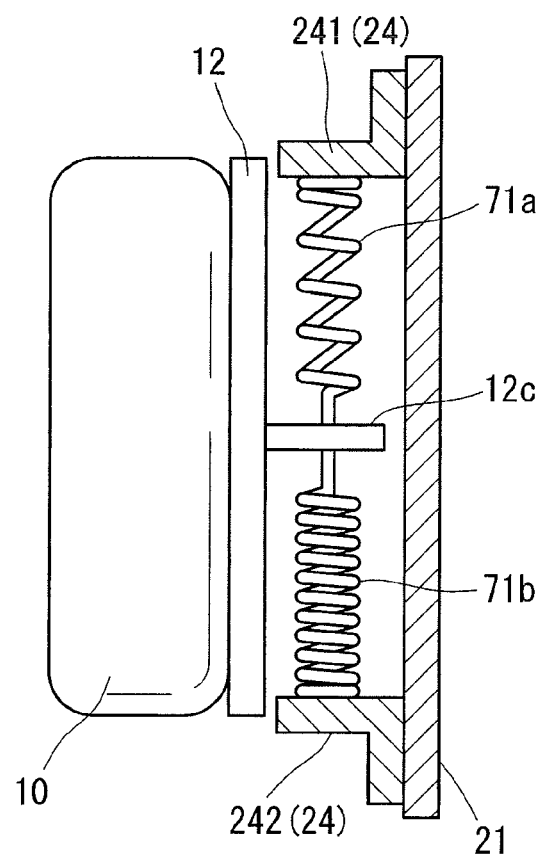
FIG. 9 is a side view of the headrest when the elastic members are at an initial setting.

In a free state, no force is applied to the headrest 5 from the head PH of the occupant P. Also in the free state, the gravitational force is applied to the second headrest portion 10. Thus, there is exerted a force to press the lower coil spring 71b down. As shown in FIG. 8, the lower coil spring 71b is longer than the upper coil spring 71a. As a result, as shown in FIG. 8, in the free state, the second headrest portion 10 is situated substantially at the center.

The height of the second headrest portion 10 is adjusted by the lengths of the coil springs 71. Instead of or in addition to this construction, the upper coil spring 71a and the lower coil spring 71b may have different spring constants. This helps to desirably adjust the height of the second headrest portion 10.

In the free state, or normal state, the second headrest portion 10 is situated at an initial position. Normally, no force is applied to the second headrest portion 10 from the occupant P. In the case of collision or the like, a force is applied to the second headrest portion 10. In the free state, the second headrest portion 10 is allowed to move in the vertical direction. The back of the head can contact the second headrest portion 10. When the head moves in the vertical direction, the second headrest portion 10 can move quickly with the head. The second headrest portion 10 can move in the vertical direction instantaneously from the initial position. Thus, solely through application of an upward or downward force, the second headrest portion 10 can move upward or downward along the headrest guide portion.

The pad 11 is provided in a front portion of the second headrest portion 10. The pad 11 has a cushioning property. The surface of the pad is covered with a headrest cover. The front surface of the pad 11 contacts the head PH of the occupant P at the time of collision or the like. The support plate 12 is provided on the back of the pad 11. The support plate 12 has a headrest slide contact portion.

Figure 2:
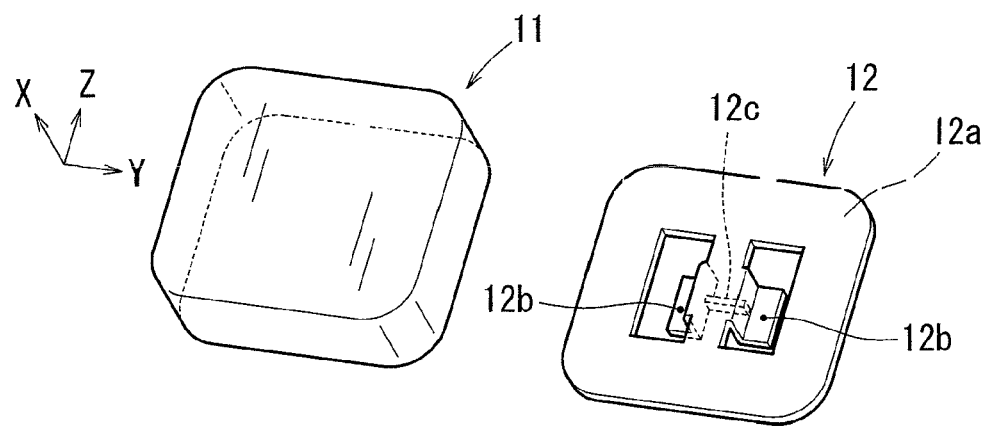
FIG. 2 is an exploded perspective view of a second headrest portion.
Figure 3:
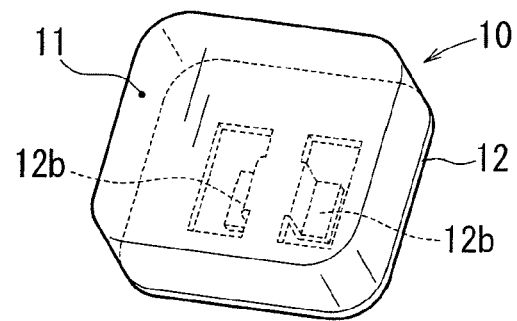
FIG. 3 is a perspective view of the second headrest portion.

As shown in FIGS. 2 and 3, the headrest slide contact portion of the support plate 12 has substantially L-shaped angle regions 12b. The angle regions 12b extend backward from a support plate region 12a which has a substantially planar configuration. The two angle regions 12b have main body portions extending parallel to each other and end portions extending in opposite lateral directions.

The elastic member contact portion 12c is formed between the angle regions 12b. Each coil spring 71 contacts the elastic member contact portion 12c. The elastic member contact portion 12c receives a pressing force from the compressed coil springs 71. The elastic member contact portion 12c consists of a flat plate connecting the two angle regions 12b substantially horizontally.

Figure 4:
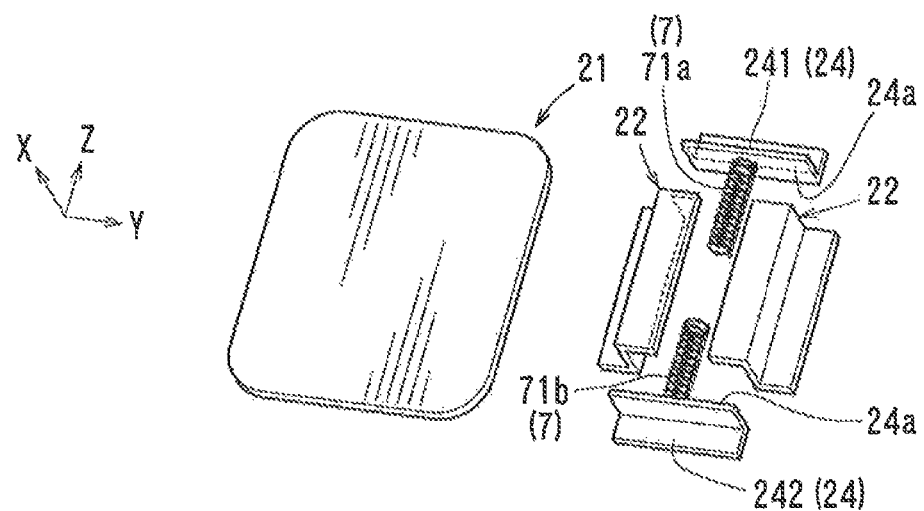
FIG. 4 is an exploded perspective view of a first headrest portion.
Figure 5:
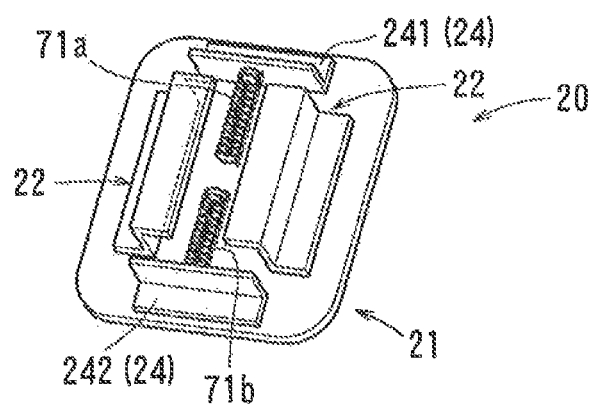
FIG. 5 is a perspective view of the first headrest portion.

The first headrest portion 20 has a base portion surface region 21 to be bonded to the headrest stay 30. The base portion surface region 21 is provided with dividing plates 22 for forming a headrest guide portion. Each of the dividing plates 22 is of a crankshaft-like configuration with three faces perpendicularly bonded together. As shown in FIG. 4, the two dividing plates 22 have front end portions extending toward the other in the lateral direction. The angle regions 12b of the second headrest portion 10 extend along and between the two dividing plates 22. As a result, there is formed a guide mechanism capable of moving the second headrest portion 10 in the vertical direction.

Elastic force receiving surfaces 24a for receiving forces from the elastic members 7 are formed above and under the dividing plates 22. The elastic force receiving surfaces 24a are connected to the coil springs 71 which constitute the elastic members 7. In the present embodiment, the elastic force receiving surfaces 24a are pressed by the coil springs 71 when the coil springs 71 are compressed. When the coil springs 71 expand, the elastic force receiving surfaces 24a receive a tensile force from the coil springs 71. The elastic force receiving surfaces 24a are provided with receiving members 24. The receiving members 24 are substantially L-shaped steel members. The elastic force receiving surfaces 24a are situated at the top and bottom portions of the base portion surface region 21.

The receiving members 24 are arranged so as to enable the coil springs 71 to be arranged between the two dividing plates 22. The coil springs 71 are arranged such that their center axes extend in the vertical direction.

The receiving member 24 provided at the top portion of the base portion surface region 21 will be referred to as the upper receiving member 241. The receiving member 24 provided at the bottom portion of the base portion surface region 21 will be referred to as the lower receiving member 242.

A method of combining the first headrest portion 20 and the second headrest portion 10 with each other in order to form the headrest 5 will be described below. The headrest stay 30 is to be fixed in position, for example, by being bonded to the first headrest portion 20.

Figure 6:
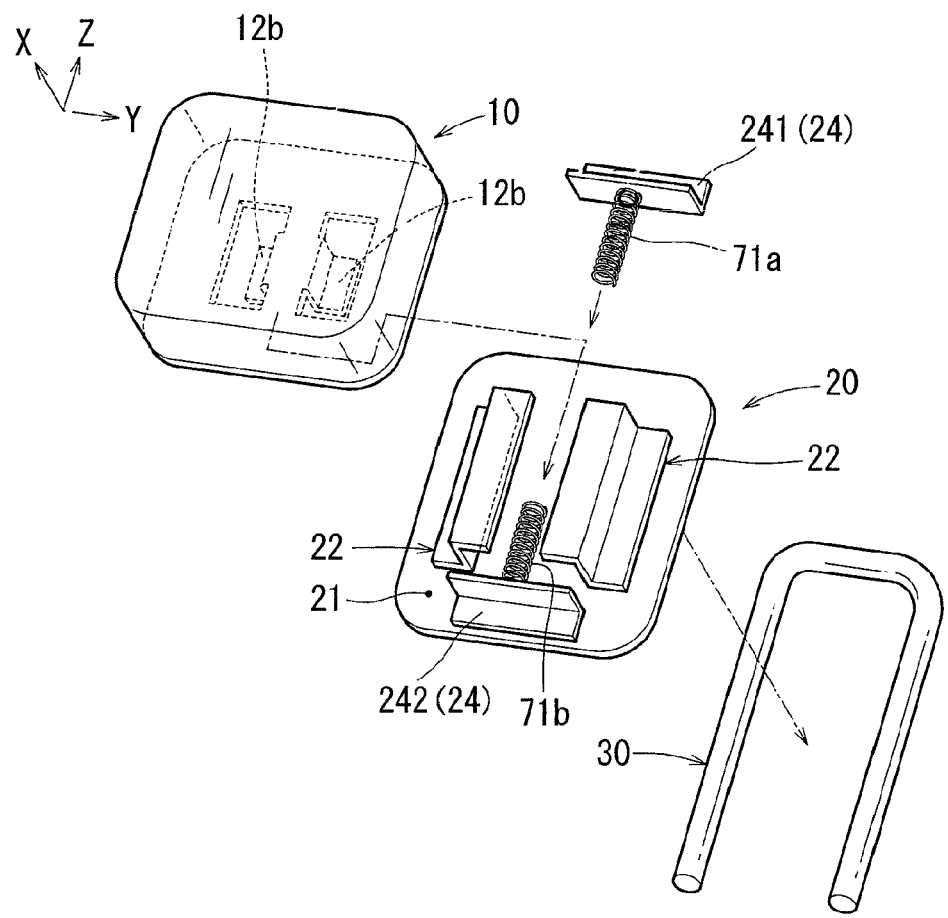
FIG. 6 is a perspective view of the first and second headrest portions and a headrest stay.

As shown in FIG. 6, the second headrest portion 10 is fitted into the first headrest portion 20. The upper receiving member 241 situated at the top portion of the first headrest portion 20 has been removed. The lower receiving member 242 situated at the bottom portion of the first headrest portion 20 has been attached. The lower coil spring 71b is connected to the lower receiving member 242. A headrest slide contact portion of the second headrest portion 10 is fitted-in so as to extend along the headrest guide portion of the first headrest portion 20. The elastic member contact portion 12c of the second headrest portion 10 is placed adjacent to the lower coil spring 71b. The lower coil spring 71b and the elastic member contact portion 12c of the second headrest portion 10 are connected to each other.

The upper coil spring 71a is connected to the upper receiving member 241. The upper coil spring 71a is connected to the top portion of the elastic member contact portion 12c. After this, the upper receiving member 241 is arranged at the top portion of the first headrest portion 20 and is fixed in position. In this way, the lower receiving member 242, the lower coil spring 71b, the elastic member contact portion 12c, the upper coil spring 71a, and the upper receiving member 241 are connected with each other.

Figure 7:
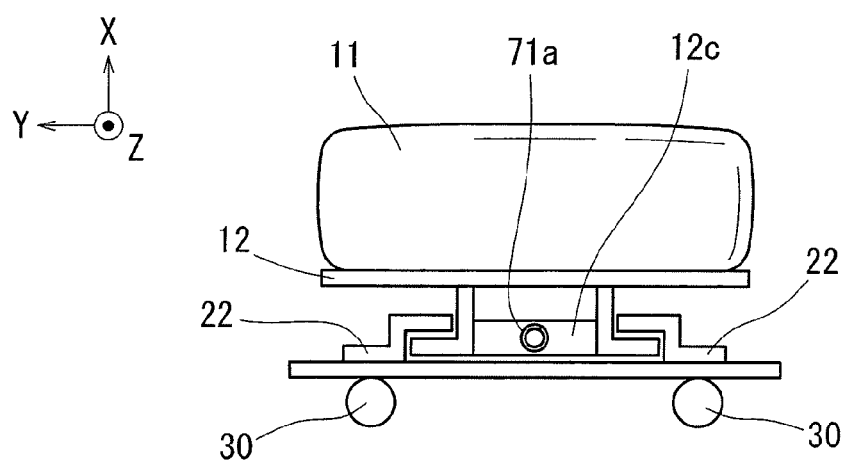
FIG. 7 is a plane view of a headrest.

The second headrest portion 10 is regulated in its movement in the longitudinal direction and the lateral direction by the guide mechanism (See FIG. 7). The guide mechanism includes the headrest slide contact portion and the headrest guide portion. The regulation of the movement in the vertical direction is effected by the upper coil spring 71a and the lower coil spring 71b, which are the deformable elastic members 7. It is substantially difficult for the second headrest portion 10 to move in the longitudinal direction or the lateral direction. The second headrest portion 10 is allowed to move solely in the vertical direction by a predetermined amount.

Next, the reason for adjusting the spring constant of the elastic portion and a spring constant adjusting method will be described. For example, where vehicle seats use the same elastic members 7, the behavior in the vertical direction of the occupant P at the time of collision varies according to the type of the car. For example, in the case where specific coil springs 71 are used, behavior as indicated by the solid line in FIG. 12 results in car A. If the vehicle is a car B, a behavior as indicated by the solid line in FIG. 13 results.

Figure 12:
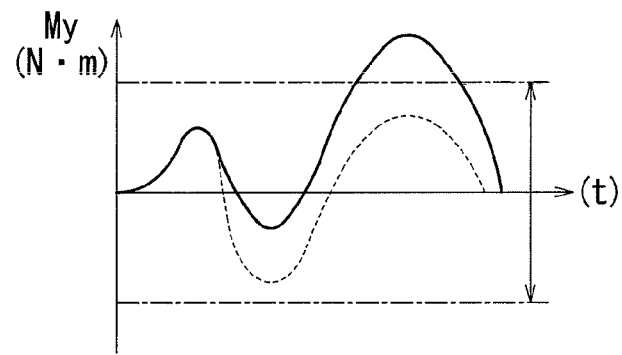
FIG. 12 is a chart for showing restriction of excess forward rotating of an occupant's head.
Figure 13:
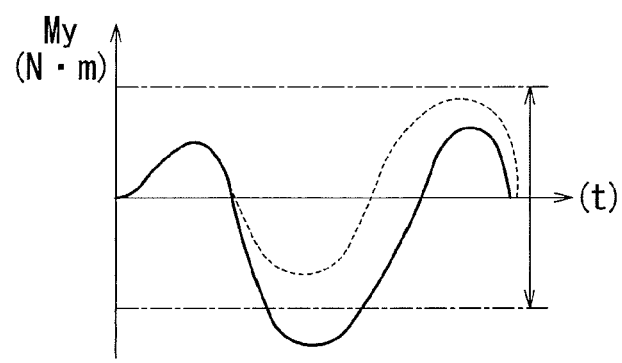
FIG. 13 is a chart for showing a restriction in the backward rotation of an occupant's head.

In FIGS. 12 and 13, the horizontal axis indicates time, and the vertical axis indicates the moment applied to the head PH. When the moment is in the region above the horizontal axis, it acts so as to cause the head PH to rotate forward. When the moment is in the region below the horizontal axis, it acts so as to cause the head PH to rotate backward. The portion between the long and short dash lines corresponds to a desired preset value. If the moment is between the upper and lower long and short dash lines, it means the moment is within a permissible range.

The solid line in FIG. 12 indicates that the force acting so as to cause the head PH to rotate backward is within the permissible range. On the other hand, the force acting so as to cause the head PH to rotate forward is larger than the permissible range. The upper coil spring 71a is replaced with a coil spring 71 having a smaller spring constant. This helps to reduce the force applied so as to cause the head PH to rotate forward or backward. Through the replacement of the coil spring 71, it is possible to effect a change, for example, to the state indicated by the dotted line.

The solid line in FIG. 13 indicates that the force acting so as to cause the head PH to rotate forward is within the permissible range. On the other hand, the force acting so as to cause the head PH to rotate backward is larger than the permissible range. The lower coil spring 71b is replaced with a coil spring 71 having a smaller spring constant. This helps to reduce the force applied so as to cause the head PH to rotate forward or backward. Through the replacement of the coil spring 71, it is possible to effect a change, for example, to the state indicated by the dotted line. The charts of FIGS. 12 and 13 are not based on experimental data. They are conceptual drawings for helping to understand the description.

Figure 14:
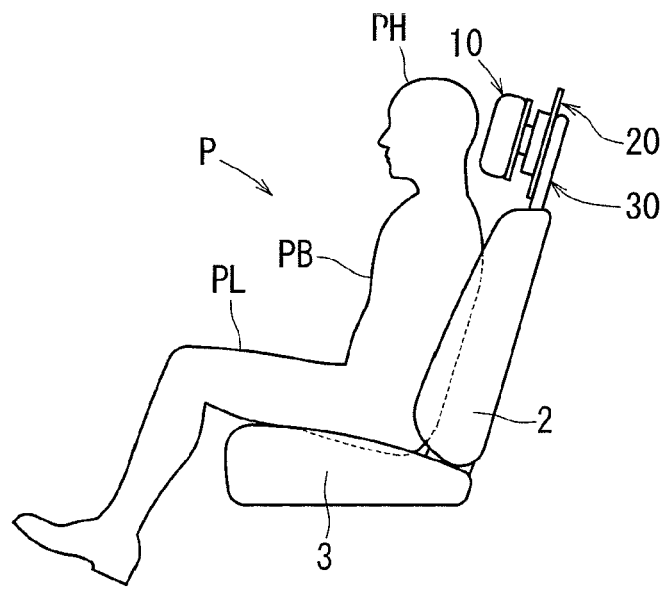
FIGS. 14 to 17 are side views of the vehicle seat and the occupant when an occupant's body moves upward due to a back collision while the second headrest portion moves upward with the occupant's head.

The behavior of the headrest 5 at the time of back collision will be schematically described. FIGS. 14 to 17 illustrate the state in which the body PB of the occupant P moves upward after back collision occurs. FIG. 14 shows a normal state in which no back collision has occurred yet. In this case, the head PH of the occupant P is spaced away from or is slightly in contact the second headrest portion 10. When an upward or a downward force is applied to the second headrest portion 10, the second headrest portion 10 moves along the direction in which the force is applied.

Figure 15:
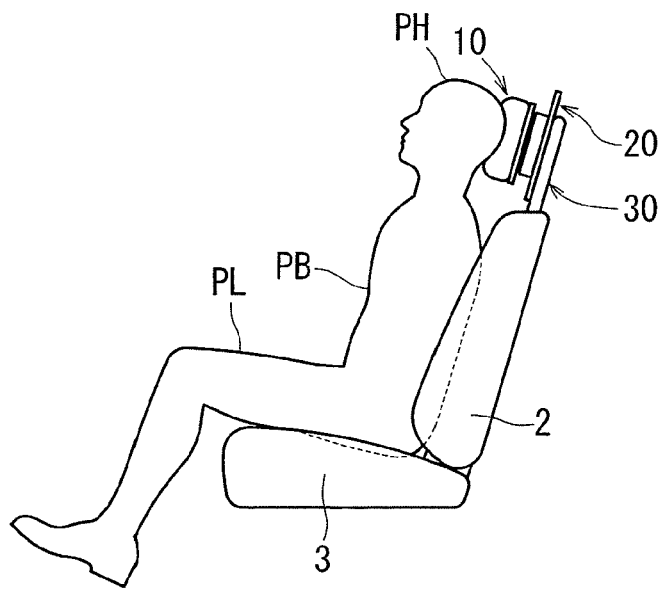
Figure 16:
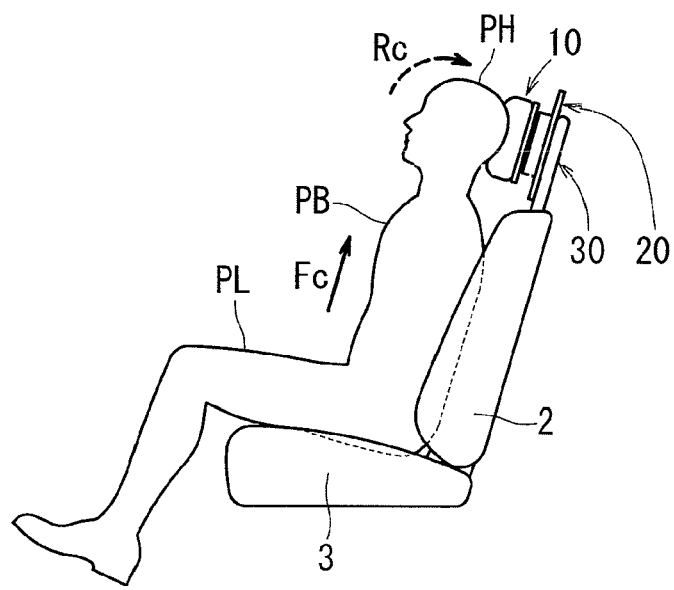

FIG. 15 shows a state when a back collision occurs. In this case, the head PH of the occupant P moves backward, and is pressed against the second headrest portion 10. After the state of FIG. 15, the body PB of the occupant P receives an upward force Fc as shown in FIG. 16. The drawing shows the state immediately before the body PB of the occupant P moves upward. The head PH of the occupant P is pressed against the second headrest portion 10. Assuming that the second headrest portion 10 is fixed, the body PB of the occupant P moves upward. In this case, the head PH of the occupant P receives a force Rc to rotate backward. This may result in the application of a large load on the occupant's neck, which is undesirable. To reduce the load, the second headrest portion 10 can slide in the vertical direction.

Figure 17:
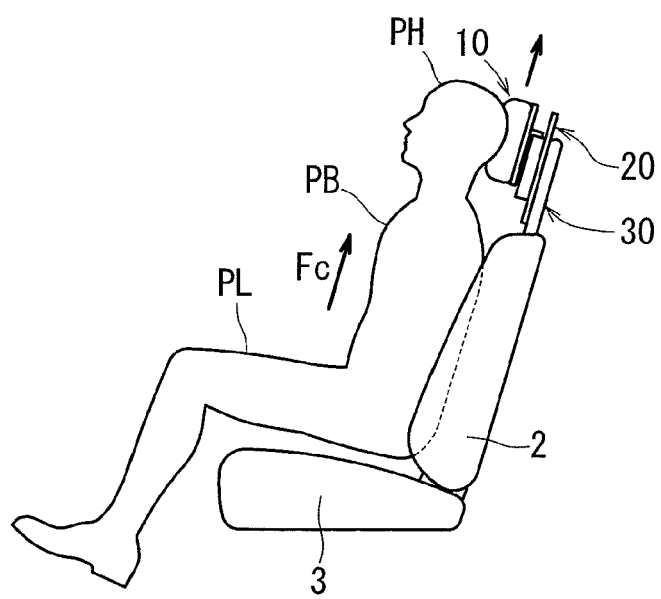

After the state of FIG. 16, the body PB and the head PH of the occupant P move upward as shown in FIG. 17. The second headrest portion 10 contacting the head PH moves upward together with the head PH. It is possible to reduce backward rotation of the head PH upon receiving the force Rc. As a result, it is possible to appropriately reduce the possibility of whiplash injury in the occupant P.

The vehicle seat 1 as a whole or the seatback 2 moves so as to fall down toward the floor F. In such a case also, it is possible to appropriately reduce the chance of whiplash injury in the occupant P.

Figure 18:
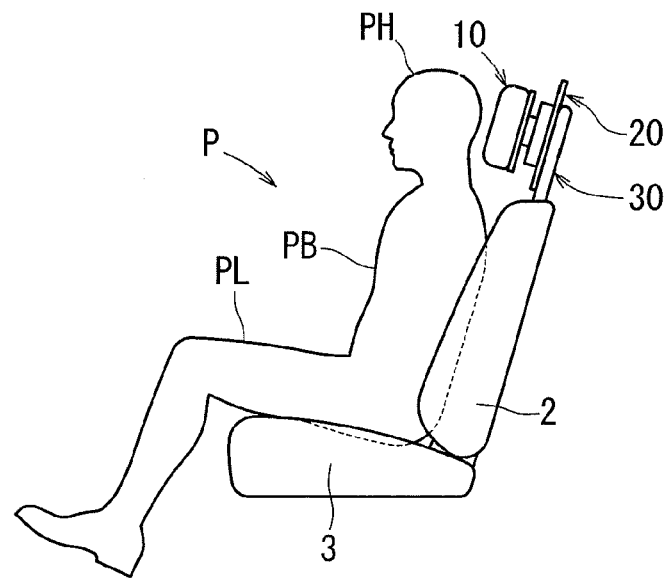
FIGS. 18 to 22 are side views of the vehicle seat and the occupant when the occupant's body moves downward due to a back collision while the second headrest portion moves downward with the occupant's head.
Figure 19:
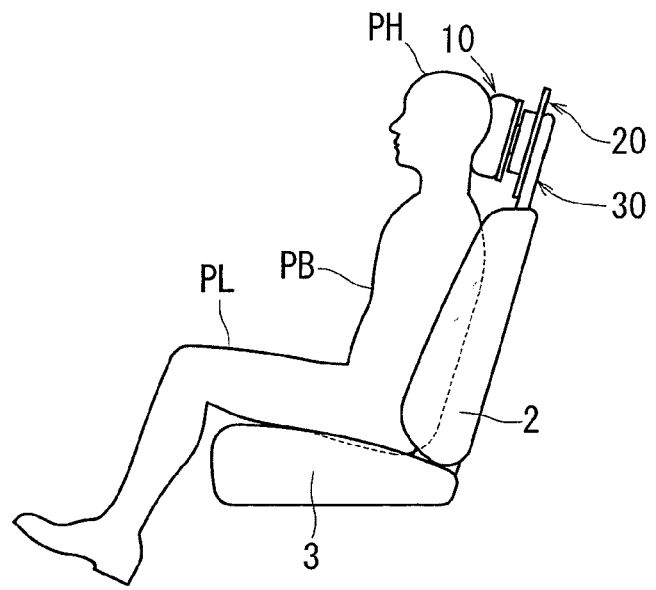

FIGS. 18 to 22 illustrate how the body PB of the occupant P moves downward after a back collision occurs. FIG. 18 shows the normal state in which no back collision has occurred yet. The head PH of the occupant P is spaced away from or is slightly in contact the second headrest portion 10. FIG. 19 shows the state when back collision occurs. The head PH of the occupant P moves backward, and is pressed against the second headrest portion 10.

Figure 20:
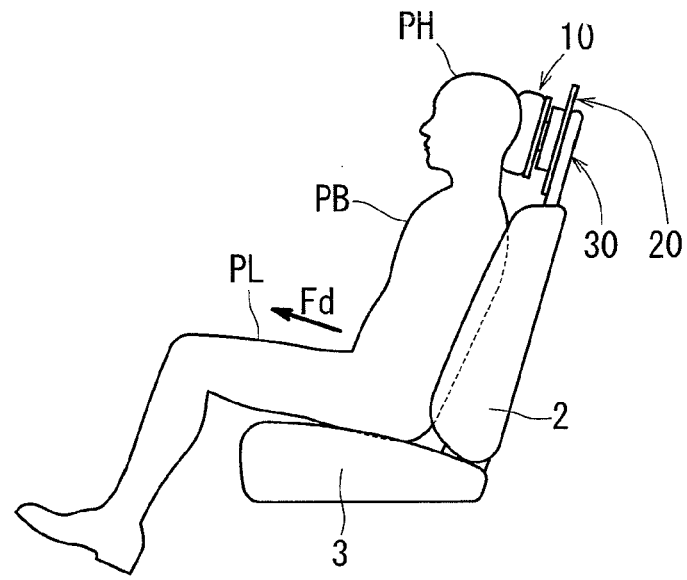

After the state of FIG. 19, a lower half of the occupant's body receives a forward rebound force Fd as shown in FIG. 20. After the back collision, the lower half of the occupant's body may be rebounded forward due to a reaction thereto or the like.

Figure 21:
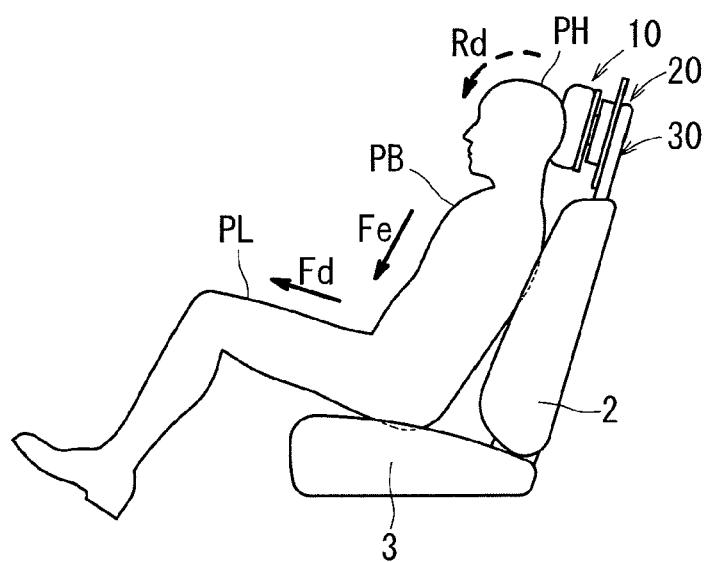

After the state of FIG. 19, the lower half of the occupant's body starts to move forward as shown in FIG. 21. When the lower half of the occupant's body moves forward, the body PB of the occupant P starts to move downward. Assuming that the position of the second headrest portion 10 is fixed, the body PB of the occupant P moves downward. In this case, the head PH of the occupant P rotates forward upon receiving a force Rd. This may result in application of a large load on the occupant's neck, which is undesirable. To reduce the load, the second headrest portion 10 can slide in the vertical direction.

Figure 22:
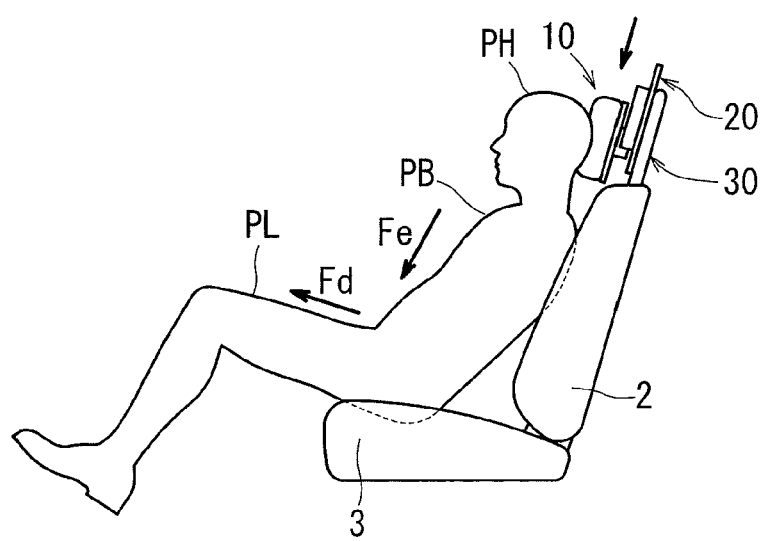

After the state of FIG. 21, the body PB and the head PH of the occupant P move downward as shown in FIG. 22. The second headrest 10 supporting the head PH moves downward together with the head PH. It is possible to reduce forward rotation of the head PH upon receiving the force Rd. As a result, it is possible to appropriately reduce the chance of whiplash injury in the occupant.

As described above, the guide mechanism enables the second headrest portion 10 to move in the vertical direction. Thus, the second headrest portion 10 can move smoothly in the vertical direction. In the initial state, the second headrest portion 10 is supported by the elastic portion. Thus it is possible for the second headrest portion 10 to move in both upward and downward from the initial state. Thus, when the head PH of the occupant P moves upward or downward, it is possible for the second headrest portion 10 to move quickly in conformity with the movement of the head PH.

In the initial state, the second headrest portion 10 is adjusted so as to be situated substantially at the center in the vertical direction. Thus, it is sufficiently possible for the second headrest portion 10 to move both upward and downward.

The second headrest portion 10 is supported by the coil springs 71. Thus, it is possible to easily perform elastic force adjustment through replacement of the coil springs 71 with those having different spring constants.

The coil springs 71 constituting the elastic members 7 are arranged on the upper and lower portions of the second headrest portion 10. As a result, the coil springs 71 work both when the head PH of the occupant P moves upward and when it moves downward. Thus, it is possible to reduce an abrupt force or moment applied to the head PH.

The second headrest portion 10 is supported by using an elastic force. Thus, by releasing the force applied to the second headrest portion 10, the second headrest portion 10 can be automatically restored to the initial state.

The elastic portion has the coil springs 71. Thus, to adjust the elastic force, coil springs 71 of an appropriate spring constant are selected. Thus, the elastic force can be easily adjusted. Further, it is also possible to adopt a mode in which the second headrest portion 10 can move solely upward from the initial position.

Figure 10:
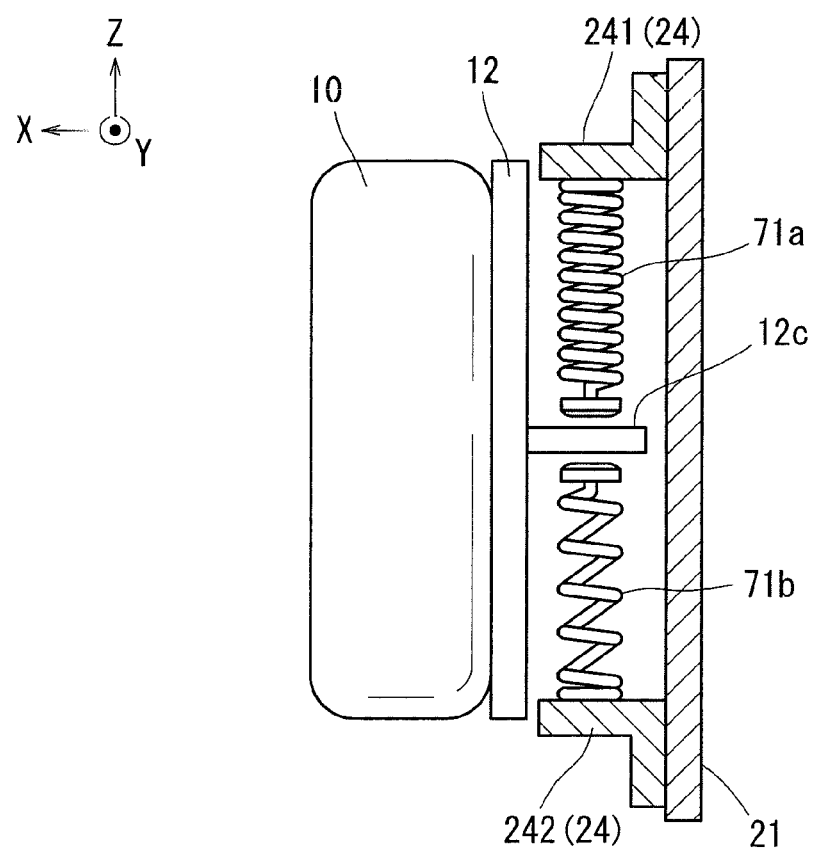
FIG. 10 is a conceptual side view of a headrest of another configuration.

Instead of the above configuration, it is also possible to adopt a configuration shown in FIG. 10. In the configuration of FIG. 10, one end of each elastic member 7 is not connected to the second headrest portion 10. When the second headrest portion 10 moves upward, the upper coil spring 71a undergoes elastic deformation, whereas the lower coil spring 71b dos not undergo elastic deformation. The elastic member contact portion 12c receives an elastic force solely from the upper coil spring 71a. Conversely, when the second headrest portion 10 moves downward, the lower coil spring 71b undergoes elastic deformation, whereas the elastic member 7 arranged above the second headrest portion does not undergo elastic deformation. The elastic member contact portion 12c receives an elastic force solely from the lower coil spring 71b.

The elastic member contact portion 12c of FIG. 10 receives a first elastic force when the second headrest portion 10 moves upward. The elastic member contact portion 12c receives a second elastic force when the second headrest portion moves downward. The first elastic force and the second elastic force can be individually set. When the elastic force exerted when the second headrest portion 10 moves upward is to be adjusted, it is only necessary to adjust the upper coil spring 71a. When the elastic force exerted when the second headrest portion 10 moves downward is to be adjusted, it is only necessary to adjust the lower coil spring 71b. Thus, fine elastic force adjustment can be easily performed.

Normally, unlike the state of FIG. 10, the gravitational force is applied to the second headrest portion 10. Thus, the lower coil spring 71b undergoes elastic deformation. No force is applied from the outside to the upper coil spring 71a, and therefore no elastic deformation results.

The coil springs 71 constituting the elastic members 7 are fixedly mounted to the first headrest portion 20. The coil springs 71 are not connected to the second headrest portion 10. It is also possible to adopt a reversed structure. In the reversed structure, the coil springs 71 constituting the elastic members 7 are fixedly mounted to the second headrest portion 10. The coil springs 71 are not connected to the first headrest portion 20. It is also possible to adopt a configuration in which the above configuration are mixed with each other. It is also possible for the coil springs 71 to be arranged between the first headrest portion 20 and the second headrest portion 10 while being connected neither to the first headrest portion 20 nor to the second headrest portion 10. This configuration needs a structure, which helps to prevent detachment of the coil springs 71.

In the configuration shown in FIG. 10, the guide mechanism allows the second headrest portion 10 to move in the vertical direction. Thus, the second headrest portion 10 can move smoothly in the vertical direction. In the initial state, the second headrest portion 10 is supported by the elastic portion. Thus, the second headrest portion 10 can move both upward and downward from the initial state. Thus, when the head PH of the occupant P moves upward and downward, the second headrest portion 10 can quickly move in conformity with the head PH.

The upper coil spring 71a and the lower coil spring 71b shown in FIG. 10 are not connected to the second headrest portion 10. As a result, the headrest 5 can be easily assembled.

The upper coil spring 71a and the lower coil spring 71b are not connected to the second headrest portion 10. Thus, the elastic force applied to the second headrest portion 10 can be easily adjusted.

Figure 11:
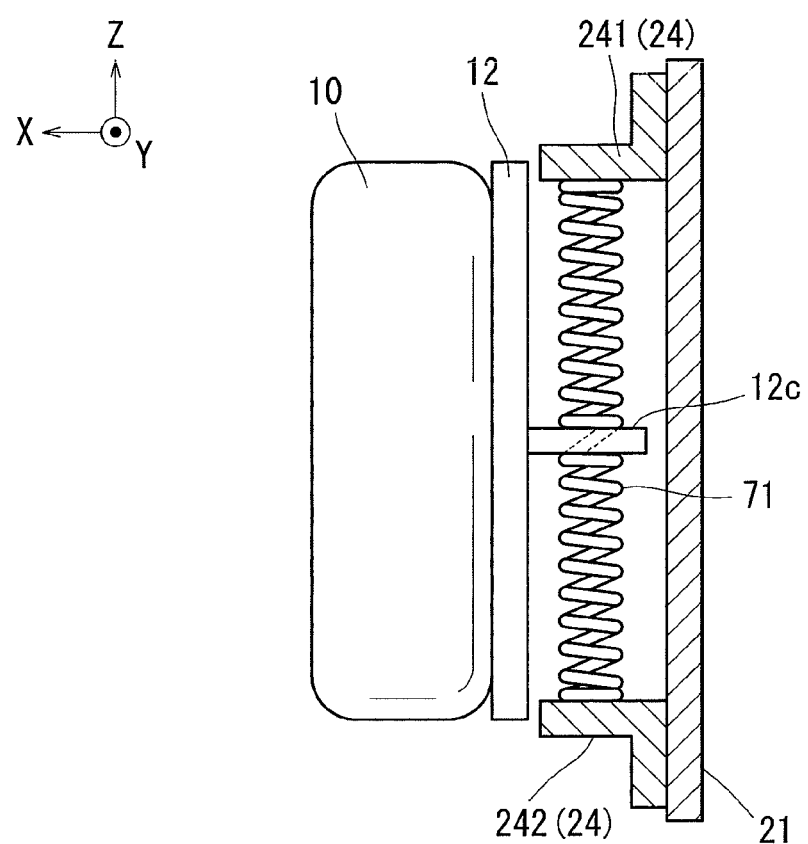
FIG. 11 is a side view of a headrest of the other configuration.

As described above, the elastic members 7 may be respectively provided above and below the elastic member contact portion 12c. Alternatively, as shown in FIG. 11, it is also possible to provide a single elastic member 7. An intermediate position of the elastic member 7 is connected to the elastic member contact portion 12c. The spring constant of the elastic member 7 can be changed halfway through, for example, by adjusting the winding interval of the elastic member 7. It is also possible to adopt an elastic member exhibiting a uniform spring constant in the longitudinal direction like an ordinary coil spring 71. It is desirable for the second headrest portion 10 to be connected to the elastic member contact portion 12c at a position somewhat above the central position of the coil spring 71. This enables the second headrest portion 10 to be situated substantially at the center in the free state in which no force is applied from the head PH of the occupant P.

It is also possible to adopt a configuration in which the second headrest portion 10 can move solely upward from the initial position. An example of the configuration will be described with reference to FIGS. 23 to 25.

Figure 23:
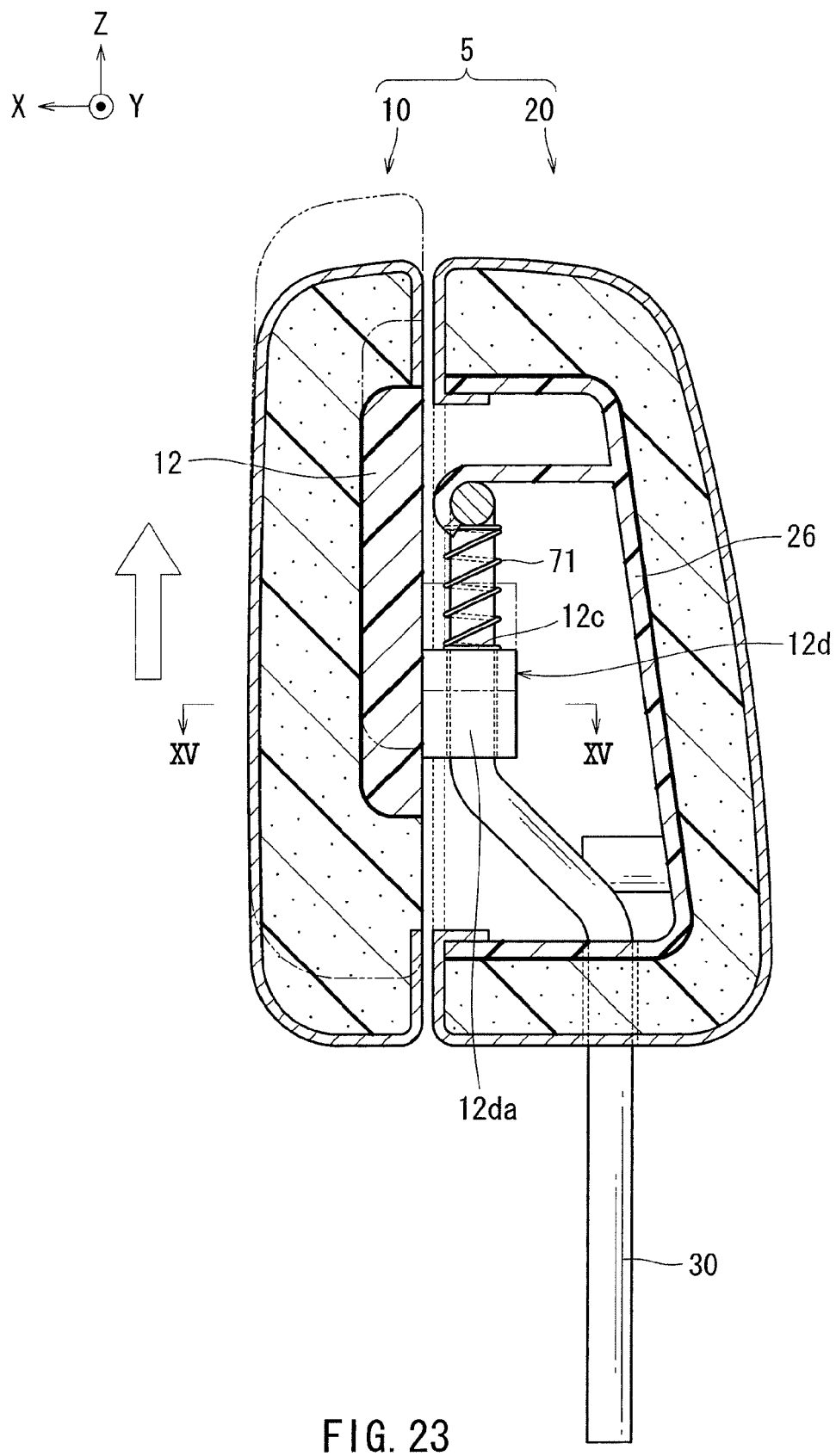
FIG. 23 is a vertical cross-section of the headrest wherein the second headrest portion is allowed only to move upward from an initial position with respect to the headrest.

In FIG. 23, the second headrest portion 10 can slide with respect to the headrest stay 30. The sliding range in the vertical direction of the second headrest portion 10 is regulated. The second headrest portion 10 is mounted to the headrest stay 30. In the normal state, the second headrest portion 10 is situated at the low end of the sliding range due to its own weight. The lower end of the sliding range is the initial position. When it moves upward from the initial position, the second headrest portion 10 receives an elastic force from the coil spring 71 which is an elastic member. The elastic force biases the displaced second headrest portion 10 so as to restore it to the initial position.

As shown in FIG. 23, the first headrest portion 20 is provided with a rear case 26. The rear case 26 supports a pad, etc. that is arranged on the rear portion of the headrest 5. The outer side of the rear case 26 is covered with the pad and a cloth-like cover.

The coil springs 71, which are elastic members, are added to the first headrest portion 20. The second headrest portion 10 is combined with the first headrest portion 20. The coil springs 71 can transmit an elastic force to the second headrest portion 10. The coil springs 71 are arranged over fit-engagement portions 12d of the second headrest portion 10. When the second headrest portion 10 is situated upward as from the initial position, the coil springs 71 generate a force restoring the second headrest portion 10 to the initial position.

Figure 24:
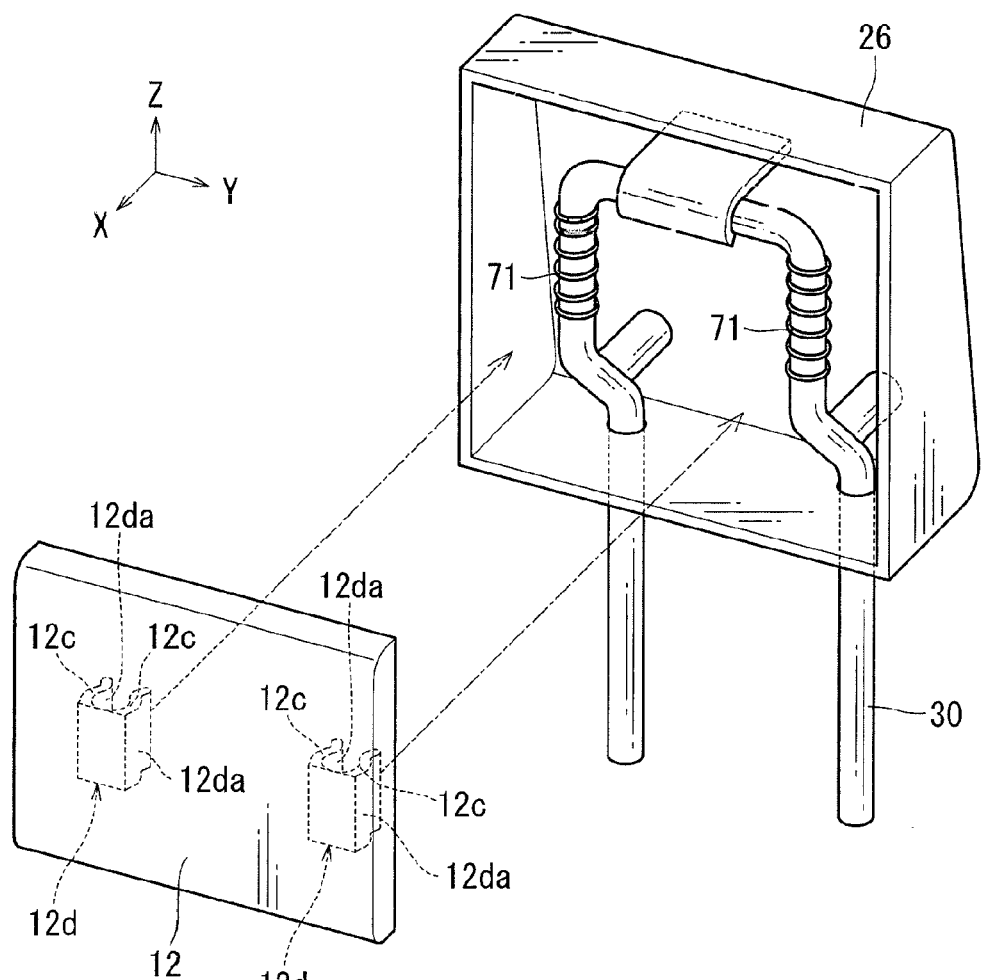
FIG. 24 is an exploded view of the headrest of FIG. 23 after removing a pad and a headrest cover.
Figure 25:
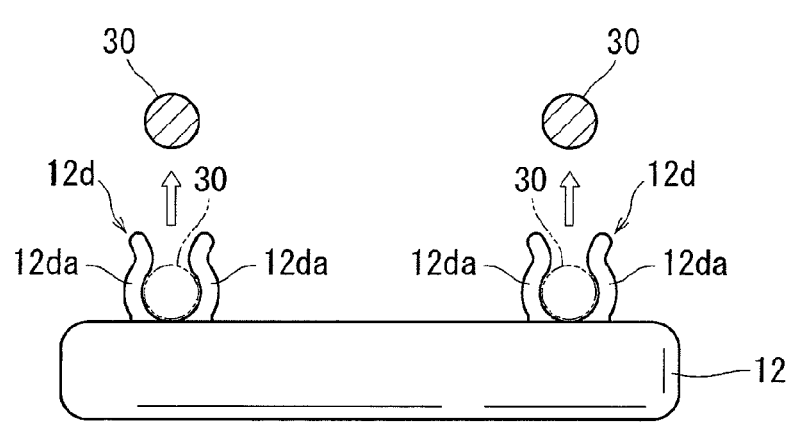
FIG. 25 is a plane view of a support plate portion being fitted with the headrest stay.

As shown in FIG. 23, the second headrest portion 10 has a support plate 12. The support plate 12 is provided with the fit-engagement portions 12d allowing fit-engagement with the headrest stay 30. Two fit-engagement portions 12d are formed so as to be capable of elastic deformation. Each fit-engagement portion 12d has two bent plates 12da protruding from the support plate 12. The fit-engagement portions 12d cover a part of the outer peripheral surfaces of the headrest stay 30 by the bent plates 12da (See FIG. 25). As shown in FIG. 24, the support plate 12 is moved in a direction perpendicular to the longitudinal direction of the headrest stay 30. The headrest stay 30 is fit-engaged with the support plate 12. As a result, the headrest stay 30 is arranged at the position indicated by the chain double-dashed lines. In FIGS. 24 and 25, the pad, etc. are omitted in order to facilitate understanding of the description.

The fit-engagement portions 12d can slide in the vertical direction with respect to the headrest stay 30. In the initial state, the support plate 12 is situated at the low end. As shown in FIG. 23, the headrest stay 30 is bent so as to determine the sliding range of the fit-engagement portions 12d. The fit-engagement portions 12d determine the range in which the support plate 12 moves due to its own weight. The fit-engagement portions 12d determine the initial state of the support plate 12. The second headrest portion 10 can move solely upward from the initial state. The chain double-dashed line in FIG. 23 indicates that the second headrest portion 10 is situated above the initial position. The hollow arrow indicates the direction in which the second headrest portion can be displaced from the initial state.

As shown in FIG. 23, the coil springs 71 and the fit-engagement portions 12d are arranged so as to contact each other. A part of the fit-engagement portions 12d plays the role of the elastic member contact portion 12c.

The coil springs 71 are arranged above the fit-engagement portions 12d. The coil springs 71 are of a columnar shape, and the headrest stay 30 is inserted into the coil springs 71. As shown in FIG. 23, the inner peripheral surfaces of the coil springs 71 face a part of the outer peripheral surface of the headrest stay 30. When the second headrest portion 10 is situated above the initial position, the coil springs 71 can contract. The support plate 12 is integrated with the pad of the second headrest portion 10 through insert molding. A cloth-like cover covers the pad.

Figure 26:
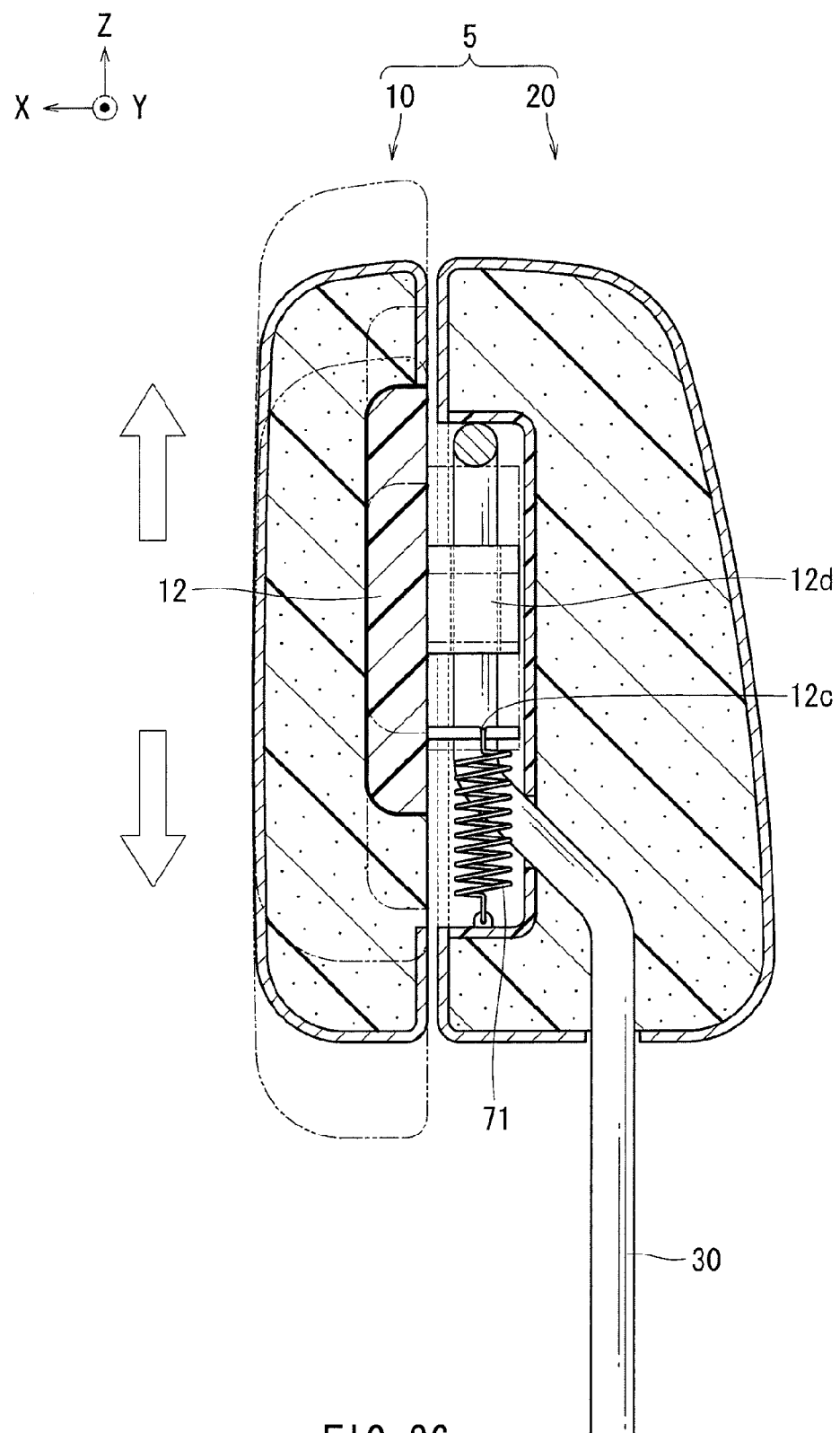
FIG. 26 is a vertical cross-section of the headrest wherein the second headrest portion is allowed to move upward and downward from an initial position with respect to the headrest.

The second headrest portion 10 may slide along the headrest stay 30. As a result, the second headrest portion 10 may move upward and downward from the initial position. For example, as shown in FIG. 26, the second headrest portion 10 may have elastic member contact portions 12e. The elastic member contact portions 12c contact the coil springs 71 separately from the fit-engagement portions 12d of the support plate 12. As shown in FIG. 26, the elastic member contact portions 12c protrude from rear of the support plate 12. The coil springs 71 can both contract and expand from the state in which the second headrest portion 10 is at the initial position. No matter whether upward or downward the second headrest portion 10 may move from the initial position, it is possible to exert a biasing force to restore the second headrest portion 10 to the initial position. The chain double-dashed line in FIG. 26 indicates that the second headrest portion 10 has moved upward or downward from the initial position.

The second headrest portion 10 moves along the headrest stay 30. The pattern 1 of FIG. 27 illustrates the behavior of the moment allowing only upward movement from the initial position of the second headrest portion 10. The pattern 2 of FIG. 27 illustrates behavior of the moment allowing movement of the second headrest portion 10 in the vertical direction from the initial position. In FIG. 27, the horizontal axis indicates time, and the vertical axis indicates the moment related to the head PH of the occupant P. The moment that a back collision occurs is the start point of the time axis. The start point is the position where the horizontal axis and the vertical axis cross each other. The thin line NL indicates a condition in which the headrest 5 moves neither upward nor downward. The thick line WL indicates the pattern 1. The dashed line DL indicates the pattern 2. FIG. 27 does not illustrate experimental data. It is a conceptual drawing for helping to understand the description.

In the pattern 1, the moment applied to the head PH of the occupant P is a moment acting so as to cause the head to rotate forward. This moment can reduce the moment acting so as to cause the head to rotate backward. In the thin line NL, there is a time period in which the moment acting so as to cause the head to rotate backward attains its peak. Also in this time period, there is generated, in the case of the thick line WL, a moment acting so as to cause the head to rotate forward. It can be seen from FIG. 27 that the magnitude of the moment at the time of its peak in the case of the thick line WL can be set smaller than the magnitude of the moment at the time of its peak in the case of the thin line NL.

In the pattern 2, the moment applied to the head PH of the occupant also acts both as a moment causing forward rotation and as a moment causing backward rotation. As indicated by the thin line NL and the dashed line DL, the headrest 5 exhibits behavior similar to that when it moved neither upward nor downward. It can be seen from FIG. 27 that the peak value of the moment indicated by the dashed line DL can be set smaller than the peak value of the moment indicated by the thin line NL. This behavior is similar to the behavior as shown in FIGS. 12 and 13. The long and short dash line of FIG. 27 indicates the timing with which the head PH of the occupant P contacts the headrest 5.

Figure 29:
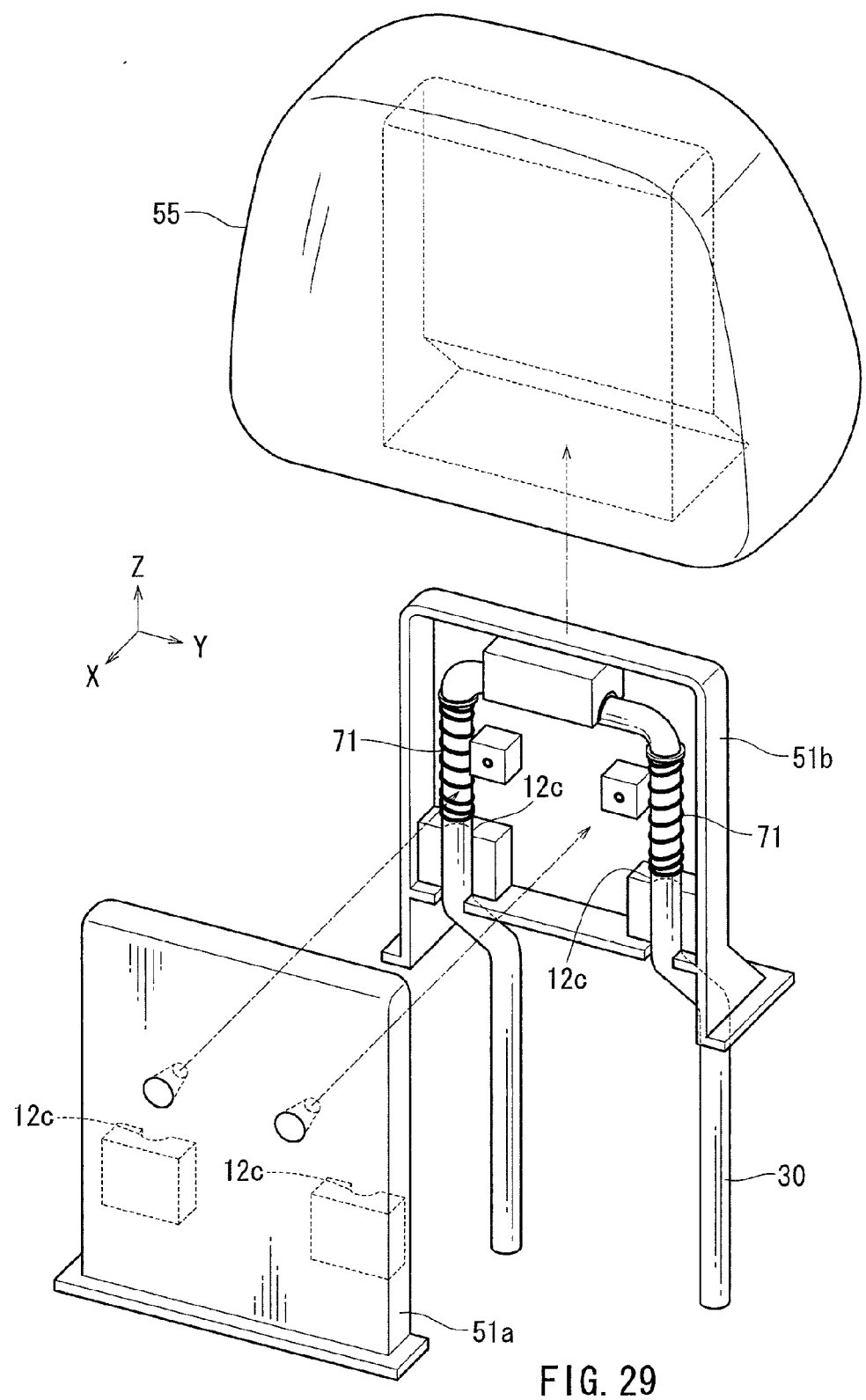
FIG. 29 is an exploded view of the headrest of FIG. 28.
Figure 30:
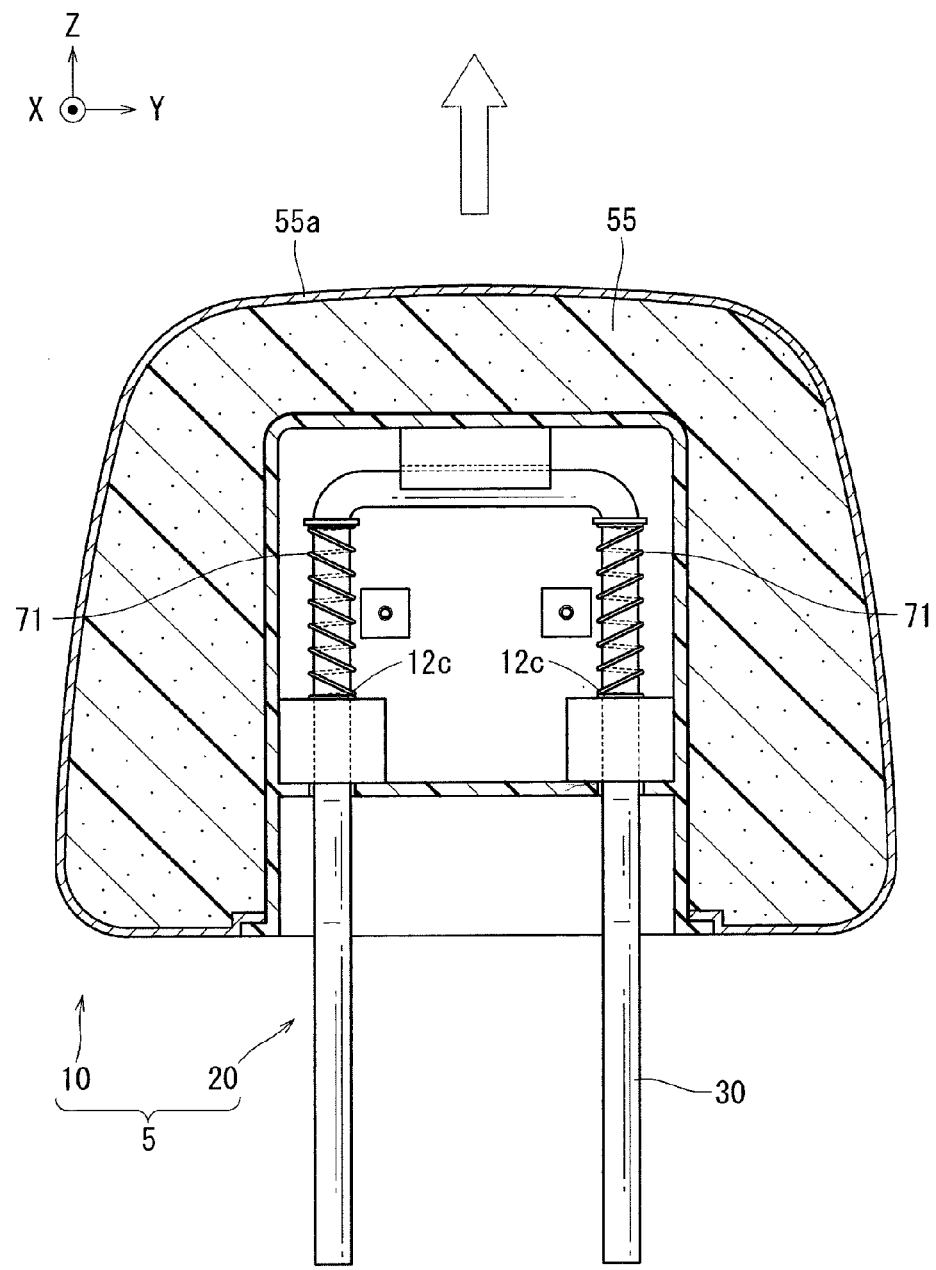
FIG. 30 is a cross-sectional view taken along line XXX-XXX in FIG. 28.

The rear portion of the headrest 5 may be formed so as to be movable together with the front portion of the headrest 5. As shown in FIGS. 28 to 30, the headrest stay 30 constitutes the first headrest portion 20. The second headrest portion 10 can move along a part of the headrest stay 30. For example, the second headrest portion 10 slidably covers an upper end of the headrest stay 30. The second headrest portion 10 can move along the headrest stay 30. The second headrest portion 10 is provided with a headrest base portion 51 configured to slide on the headrest stay 30.

The headrest base portion 51 has a front base portion 51a covering the front of the headrest stay 30 and a rear base portion 51b covering the rear of the headrest stay 30. The headrest base portion 51 has an outer peripheral surface supporting a headrest pad 55 while in contact therewith. The headrest pad 55 has a hole portion allowing itself to cover the headrest base portion 51. As shown in FIGS. 29 and 30, the headrest pad 55 is fixed to the front base portion 51a and the rear base portion 51b. A headrest cover 55a covers the headrest pad 55. The headrest cover 55a may be inseparably integrated with the headrest pad 55. Alternatively, the headrest cover 55a may exist independently of the headrest pad 55.

As shown in FIG. 28, etc., the headrest base portion 51 is movably mounted on the headrest stay 30. The headrest base portion 51 contacts upper end portions of the headrest stay 30. A rubber member 73 is provided at a part of the headrest base portion 51. The rubber member 73 functions as a buffer member to mitigate the shock when the headrest stay 30 and the headrest base portion 51 contact each other. The rubber member 73 has a groove having an arcuate cross-sectional shape. Thereby, the rubber member 73 is fit-engaged with the headrest stay 30.

When the second headrest portion 10 moves upward as indicated by a chain double-dashed line of FIG. 28, the elastic portion biases the second headrest portion 10 to its initial position. As shown in FIG. 28, etc., the elastic portion has coil springs 71. The coil springs 71 have a spiral shape extending along a part of an outer peripheral surface of the headrest stay 30. The coil springs 71 contact the elastic member contact portions 12c of the headrest base portion 51.

Each coil spring 71 has a first end contacting the elastic member contact portion 12c and a second end at opposite of the first end. Each second end is locked to the headrest stay 30. This helps to regulate upward movement of the coil springs 71 from a predetermined position. It is also possible to arrange an elastic member under each elastic member contact portion 12c. As a result, even when the second headrest portion 10 moves downward, the elastic member may bias the second headrest portion 10 to the initial position.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

As described above, the elastic portion may be provided separately from the first headrest portion. Alternatively, the elastic portion may be formed in a part of the first headrest portion. The part is formed so as to be capable to be elastically deformed.

The initial position of the second headrest portion may not be the central position of the movement range in the vertical direction. The initial position of the second headrest portion is preferably at the central position of the movement range with regard to its movement in the vertical direction.

As described above, the elastic members may consist of coil springs. Alternatively, the elastic members may consist of various other elastic members such as plate springs.

In the initial state, both the upper elastic member and the lower elastic member may be elastically deformed such as compressed.

As described above, the headrest may have one or two elastic members. Alternatively, the headrest may have three or more elastic members. The number of the upper elastic members and the number of the lower elastic members may be equal to or different from each other.

As described above, there is provided a guide portion for determining the moving direction of the second headrest portion. The guide portion may be provided on the rear surface of the second headrest portion. Alternatively, the guide mechanism may be provided on a side surface of the second headrest portion.

As described above, the elastic force receiving surface may receive both a pressing force and a tensile force from the elastic member. Alternatively, the elastic force receiving surface may only receive a pressing force or a tensile force.

The first headrest portion may be provided with a recess in which a coil spring can be arranged. The bottom surface of the recess may receive an elastic force.

As described above, the vehicle may be a car. Alternatively, the vehicle may be one flying through the air such as an airplane or a helicopter. Alternatively, the vehicle may be one configured to move on or in the sea such as a ship or a submarine.

This invention claims:

1. A vehicle seat comprising:
    a seatback; and
    a headrest having:
        a first headrest portion connected to the seatback,
        a second headrest portion arranged to be closer to an occupant than the first headrest portion, the second headrest portion configured to be movable relative to the first headrest portion, and
        an elastic portion configured to generate an elastic force so as to restore the second headrest portion to an initial position when the second headrest portion moves from the initial position.

2. The vehicle seat of claim 1, wherein the elastic portion comprises an upper elastic member provided above an elastic member contact portion of the second headrest portion and a lower elastic member provided below the elastic member contact portion.

3. The vehicle seat of claim 2, wherein the upper elastic member has a first elastic modulus and the lower elastic member has a second elastic modulus which is different from the first elastic modulus.

4. The vehicle seat of claim 1, further comprising a guide mechanism configured to guide the second headrest portion so that the second headrest portion is allowed to move in a vertical direction.

5. The vehicle seat of claim 4, wherein the elastic portion is configured to bias the second headrest portion at the initial position at least upwardly.

6. The vehicle seat of claim 5, wherein the second headrest portion is configured to move both upward and downward from the initial position.

7. The vehicle seat of claim 1, wherein the elastic portion comprises:
    an upper elastic member configured to be able to expand and contract in a vertical direction, and the upper elastic member being positioned above an elastic member contact portion of the second headrest portion, and
    a lower elastic member configured to be able to expand and contract in the vertical direction, and the lower elastic member being positioned below the elastic member contact portion, and
    wherein at least one of the upper elastic member and the lower elastic member has an end configured so as to be able to be separate from both the first headrest portion and the second headrest portion.

8. The vehicle seat of claim 1, further comprising a headrest stay attached to the seatback, wherein the second headrest portion is structured and arranged to move in a direction substantially parallel to an extension direction of the headrest stay.

9. The vehicle seat of claim 1, further comprising a headrest stay attached to the seatback, wherein the first headrest portion is fixed to the headrest stay and wherein the second headrest portion is attached to the headrest stay to move along the headrest stay.

\* \* \* \* \*